(12) United States Patent
John Wilson et al.

(10) Patent No.: US 11,310,005 B2
(45) Date of Patent: Apr. 19, 2022

(54) TECHNIQUES FOR COMMUNICATING USING MULTIPLE TRANSMISSION POINTS WIRELESS COMMUNICATIONS

(71) Applicant: QUALCOMM Incorporated, San Diego, CA (US)

(72) Inventors: Makesh Pravin John Wilson, San Diego, CA (US); Tao Luo, San Diego, CA (US); Mostafa Khoshnevisan, San Diego, CA (US); Xiaoxia Zhang, San Diego, CA (US); Jing Sun, San Diego, CA (US); Vinay Chande, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/712,915

(22) Filed: Dec. 12, 2019

(65) Prior Publication Data
US 2020/0195397 A1 Jun. 18, 2020

Related U.S. Application Data

(60) Provisional application No. 62/780,102, filed on Dec. 14, 2018.

(51) Int. Cl.
*H04L 5/00* (2006.01)
*H04W 28/02* (2009.01)
*H04W 36/00* (2009.01)
*H04B 7/024* (2017.01)

(52) U.S. Cl.
CPC .......... *H04L 5/0035* (2013.01); *H04B 7/024* (2013.01); *H04L 5/001* (2013.01); *H04L 5/0094* (2013.01);
(Continued)

(58) Field of Classification Search
None
See application file for complete search history.

(56) References Cited

U.S. PATENT DOCUMENTS

2013/0267239 A1* 10/2013 Stancanelli ............ H04B 7/024
455/452.1
2017/0332371 A1* 11/2017 Kubota .................. H04L 5/0035
(Continued)

OTHER PUBLICATIONS

CATT: "Further Issues With Switching of Bandwidth Part And Random Access", 3GPP Draft, 3GPP TSG-RAN WG2#102, R2-1806991, Further Issues With Switching of Bandwidth Part And Random Access, 3rd Generation Partnership Project (3GPP), Mobile Competence Centre, 650, Route Des Lucioles, F-06921, Sophia-Antipolis Cedex, France, vol. RAN WG2, No. Busan, Korea, May 21, 2018-May 25, 2018, May 11, 2018 (May 11, 2018), XP051464488, pp. 1-6, Retrieved from the Internet: URL: http://www.3gpp.org/ftp/tsg%5Fran/WG2%5FRL2/TSGR2%5F102/Docs [retrieved on.
(Continued)

*Primary Examiner* — San Htun
(74) *Attorney, Agent, or Firm* — Arent Fox LLP

(57) ABSTRACT

Aspects described herein relate to communicating in a wireless network based on a configured set of one or more transmission points (TRPs), receiving an instruction to modify the set of one or more TRPs, modifying, based on the instruction, the set of one or more TRPs to generate a modified set of one or more TRPs, and communicating in the wireless network based on the modified set of one or more TRPs.

30 Claims, 6 Drawing Sheets

(52) U.S. Cl.
CPC ....... *H04L 5/0098* (2013.01); *H04W 28/0231* (2013.01); *H04W 36/0069* (2018.08)

(56) References Cited

U.S. PATENT DOCUMENTS

| | | | | |
|---|---|---|---|---|
| 2018/0192384 | A1* | 7/2018 | Chou | H04W 72/044 |
| 2018/0368116 | A1* | 12/2018 | Liao | H04L 5/0053 |
| 2019/0037579 | A1* | 1/2019 | Yi | H04L 5/001 |
| 2019/0045491 | A1* | 2/2019 | Zhang | H04W 72/0453 |
| 2019/0098655 | A1* | 3/2019 | Shih | H04W 72/0413 |
| 2019/0289513 | A1* | 9/2019 | Jeon | H04W 36/06 |

OTHER PUBLICATIONS

Ericsson: "On Beam Indication, Measurement and Reporting", 3GPP Draft, 3GPP TSG-RAN WG1 #90bis, R1-1718433, On Beam Indication, Measurement and Reporting, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017 (Oct. 8. 2017), XP051341615, 9 Pages, Retrieved from the Internet: URL: http://www.3gpp.org/ftp/Meetings_3GPP_SYNC/RAN1/Docs/ [retrieved on Oct. 8, 2017], Section 2.

Huawei, et al., "RAN2 Aspects of DL Beam Management",3GPP Draft, 3GPP TSG-RAN WG2#99bis, R2-1710562, RAN2 aspects of DL Beam Management, 3rd Generation Partnership Project (3GPP), Mobile Competence Centre, 650, Route Des Lucioles, F-06921, Sophia-Antipolis Cedex, France, vol. RAN WG2, No. Prague, Czech Republic, Oct. 9, 2017-Oct. 13, 2017, Oct. 8, 2017 (Oct. 8, 2017), XP051342600, 4 pages, Retrieved from the Internet: URL: http://www.3gpp.org/ftp/Meetings_3GPP_SYNC/RAN2/Docs [retrieved on Oct. 8, 2017], paragraph [0002].

International Search Report and Written Opinion—PCT/US2019/066328—ISA/EPO—dated Mar. 11, 2020.

* cited by examiner

TECHNIQUES FOR COMMUNICATING USING MULTIPLE TRANSMISSION POINTS WIRELESS COMMUNICATIONS

CLAIM OF PRIORITY UNDER 35 U.S.C. § 119

The present Application for Patent claims priority to Provisional Application No. 62/780,102, entitled "TECHNIQUES FOR COMMUNICATING USING MULTIPLE TRANSMISSION POINTS WIRELESS COMMUNICATIONS" filed Dec. 14, 2018, which is assigned to the assignee hereof and hereby expressly incorporated by reference herein for all purposes.

BACKGROUND

Aspects of the present disclosure relate generally to wireless communication systems, and more particularly, to communicating using multiple transmission points.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes communicating in a wireless network based on a configured set of one or more transmission points (TRPs), receiving an instruction to modify the set of one or more TRPs, wherein receiving the instruction comprises receiving the instruction to switch a bandwidth part (BWP) used to communicate in the wireless network, wherein the BWP corresponds to modifying the set of one or more TRPs, modifying, based on the instruction to switch the BWP, the set of one or more TRPs to generate a modified set of one or more TRPs, and communicating in the wireless network based on the modified set of one or more TRPs.

In another example, an apparatus for wireless communication is provided including a transceiver, a memory configured to store instructions related to configuring a set of one or more TRPs, and one or more processors communicatively coupled with the transceiver and the memory. The one or more processors are configured to communicate in a wireless network based on a configured set of one or more TRPs, receive an instruction to modify the set of one or more TRPs, wherein receiving the instruction comprises receiving the instruction to switch a BWP used to communicate in the wireless network, wherein the BWP corresponds to modifying the set of one or more TRPs, modify, based on the instruction to switch the BWP, the set of one or more TRPs to generate a modified set of one or more TRPs, and communicate in the wireless network based on the modified set of one or more TRPs.

In another example, an apparatus for wireless communication is provided that includes means for communicating in a wireless network based on a configured set of one or more TRPs, means for receiving an instruction to modify the set of one or more TRPs, wherein receiving the instruction comprises receiving the instruction to switch a BWP used to communicate in the wireless network, wherein the BWP corresponds to modifying the set of one or more TRPs, means for modifying, based on the instruction to switch the BWP, the set of one or more TRPs to generate a modified set of one or more TRPs, and means for communicating in the wireless network based on the modified set of one or more TRPs.

In another example, a computer-readable medium, including code executable by one or more processors for wireless communications is provided. The code includes code for communicating in a wireless network based on a configured set of one or more TRPs, receiving an instruction to modify the set of one or more TRPs, wherein receiving the instruction comprises receiving the instruction to switch a BWP used to communicate in the wireless network, wherein the BWP corresponds to modifying the set of one or more TRPs, modifying, based on the instruction to switch the BWP, the set of one or more TRPs to generate a modified set of one or more TRPs, and communicating in the wireless network based on the modified set of one or more TRPs.

In another example, a method of wireless communication is provided. The method includes configuring a user equipment (UE) with a configured set of one or more TRPs for communicating in a wireless network, and transmitting, to the UE, an instruction to modify the set of one or more TRPs to at least one of activate communications with at least one TRP to the set of one or more TRPs or deactivate communications with at least one TRP from the set of one or more TRPs. Transmitting the instruction includes transmitting the instruction to switch a bandwidth part (BWP) used to communicate in the wireless network, wherein the BWP corresponds to a single TRP or multiple TRPs.

In another example, an apparatus for wireless communication is provided that includes a transceiver, a memory configured to store instructions related to configuring a set of one or more TRPs, and one or more processors communicatively coupled with the transceiver and the memory. The one or more processors are configured to configure a UE with a configured set of one or more TRPs for communicating in a wireless network, and transmit, to the UE, an instruction to modify the set of one or more TRPs to at least one of activate communications with at least one TRP to the set of one or more TRPs or deactivate communications with at least one TRP from the set of one or more TRPs. The one or more processors are configured to transmit the instruction to switch a BWP used to communicate in the wireless network, wherein the BWP corresponds to a single TRP or multiple TRPs.

In another example, an apparatus for wireless communication is provided including means for configuring a UE with a configured set of one or more TRPs for communicating in a wireless network, and means for transmitting, to the UE, an instruction to modify the set of one or more TRPs to at least one of activate communications with at least one TRP to the set of one or more TRPs or deactivate communications with at least one TRP from the set of one or more TRPs. The means for transmitting transmits the instruction to switch a BWP used to communicate in the wireless network, wherein the BWP corresponds to a single TRP or multiple TRPs.

In another example, a computer-readable medium, including code executable by one or more processors for wireless communications is provided. The code includes code for configuring a UE with a configured set of one or more TRPs for communicating in a wireless network, and transmitting, to the UE, an instruction to modify the set of one or more TRPs to at least one of activate communications with at least one TRP to the set of one or more TRPs or deactivate communications with at least one TRP from the set of one or more TRPs. The code for transmitting transmits the instruction to switch a BWP used to communicate in the wireless network, wherein the BWP corresponds to a single TRP or multiple TRPs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
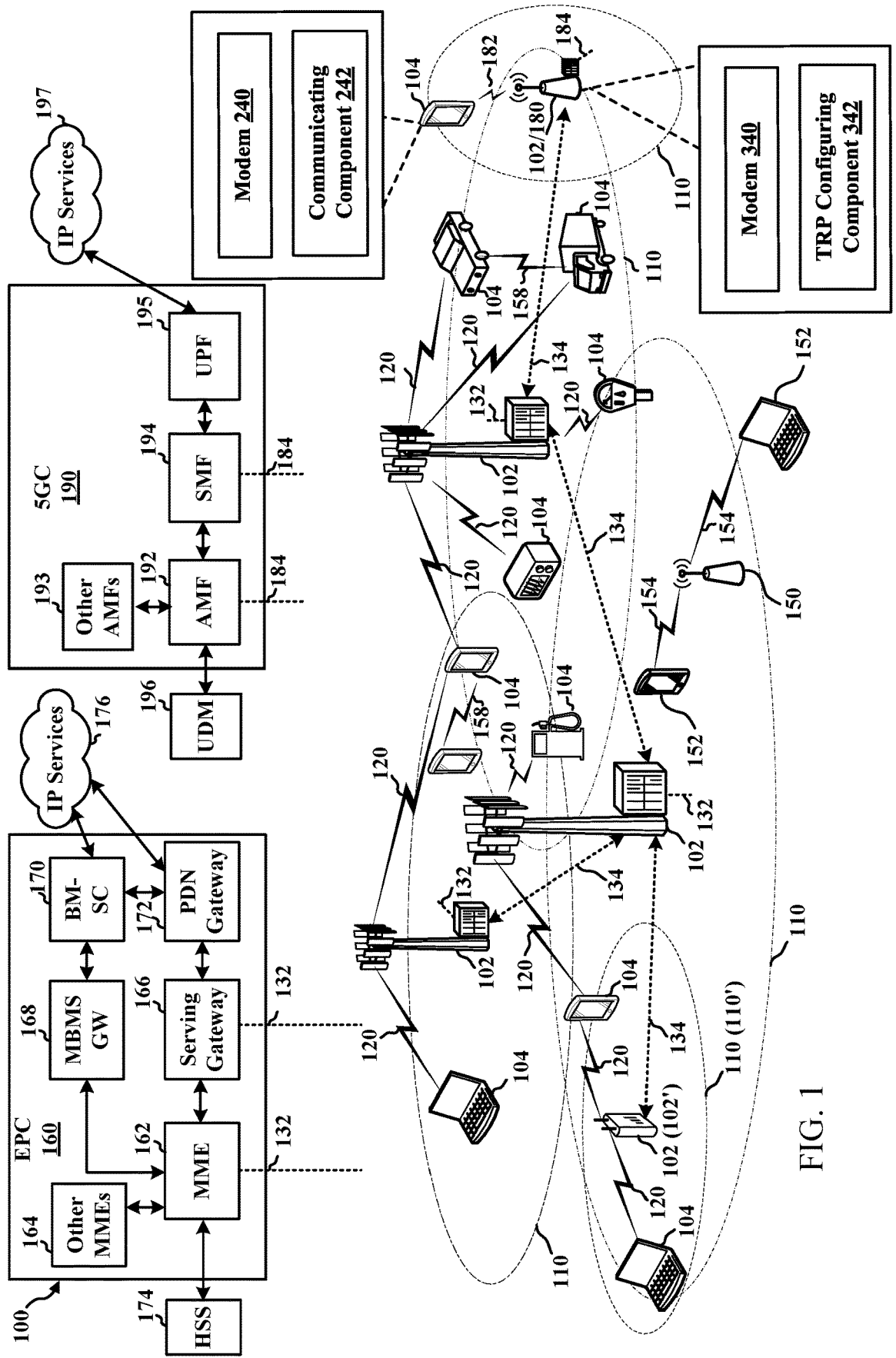
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to configuring a device to communicate with multiple transmission points (TRPs) in wireless communications. In an example, communicating with multiple TRPs can provide for higher capacity, improved robustness, etc., in communications to the device. In one example, a TRP (e.g., a gNB) can be configured to activate and/or deactivate multi-TRP operation for a device. In an example, the device can be configured to identify multiple TRPs for multi-TRP operation, and the TRP can activate and/or deactivate multi-TRP operation and/or related TRPs based on a report from the device (or otherwise without the report from the device). Multi-TRP operation can be configured for the device using various signaling possibilities, such as radio resource control (RRC)-layer signaling, media access control (MAC)-control element (CE), etc. In addition, in an example, downlink control information (DCI) can be used to configure multi-TRP operation.

In a specific example, bandwidth part (BWP) switching can be used to activate and/or deactivate TRPs or to otherwise switch between single-TRP to multi-TRP operation and/or vice versa. As described further herein, a BWP can be configured for a given component carrier (CC), such that each CC can include one or more BWPs, and a BWP can correspond to one or more TRPs. In an example, a BWP configuration can be specified where a given BWP can be associated with one TRP or multiple TRPs (e.g., based on identifier(s) of the TRP(s) included in the BWP configuration). For example, a BWP can be a portion of bandwidth of a corresponding CC, and thus each CC can include one or more BWPs. In addition, the BWPs can include distinct or overlapping portions of bandwidth, and thus may be commonly or separately configured for a given CC depending on whether the corresponding bandwidth overlaps.

In another example, various parameters in DCI can be used to activate and/or deactivate TRPs or to otherwise switch between single-TRP to multi-TRP operation and/or vice versa. For example, quasi-colocation (QCL) relationships specified in a TCI state in DCI can indicate whether to use multi-TRP or single-TRP operations and/or a configuration of TRPs to use. In any case, multi-TRP operation can be enabled for a device to facilitate improved capacity/robustness in wireless communications.

The described features will be presented in more detail below with reference to FIGS. 1-6.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for communicating with multiple TRPs, and some nodes may have a modem 340 and TRP configuring component 342 for configuring devices to communicate with multiple TRPs, as described herein. Though a UE 104 is shown as having the modem 240 and communicating component 242 and a base station 102/gNB 180 is shown as having the modem 340 and TRP configuring component 342, this is one illustrative example, and substantially any node or type of node may include a modem 240 and communicating component 242 and/or a modem 340 and TRP configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 can activate and/or deactivate communications with one or more TRPs to establish multi-TRP (or single-TRP) operations, which may or may not be based on a configuration received from one or more of the TRPs. In addition, TRP configuring component 342 can configure communications over multiple TRPs based on one or more parameters of a configuration provided to a device, as described further herein. In one example, a TRP can be a base station 102, such as a gNB, and a device can be a UE 104 configured to communicate with the base station 102 and/or other TRPs (e.g., other base stations 102, etc.). In an example, multiple-TRPs can be configured to operate in Mode 1, which corresponds to an ideal backhaul such that one TRP transmits control information (e.g., over a physical downlink control channel (PDCCH)) for the multiple TRPs and/or can transmit control information for specific TRPs using specific layers of the same PDCCH communication. In another example, multiple-TRPs can be configured to operate in Mode 2, which corresponds to a non-ideal backhaul such that each TRP can transmit its own control information (e.g., over its own PDCCH).

Figure 2:
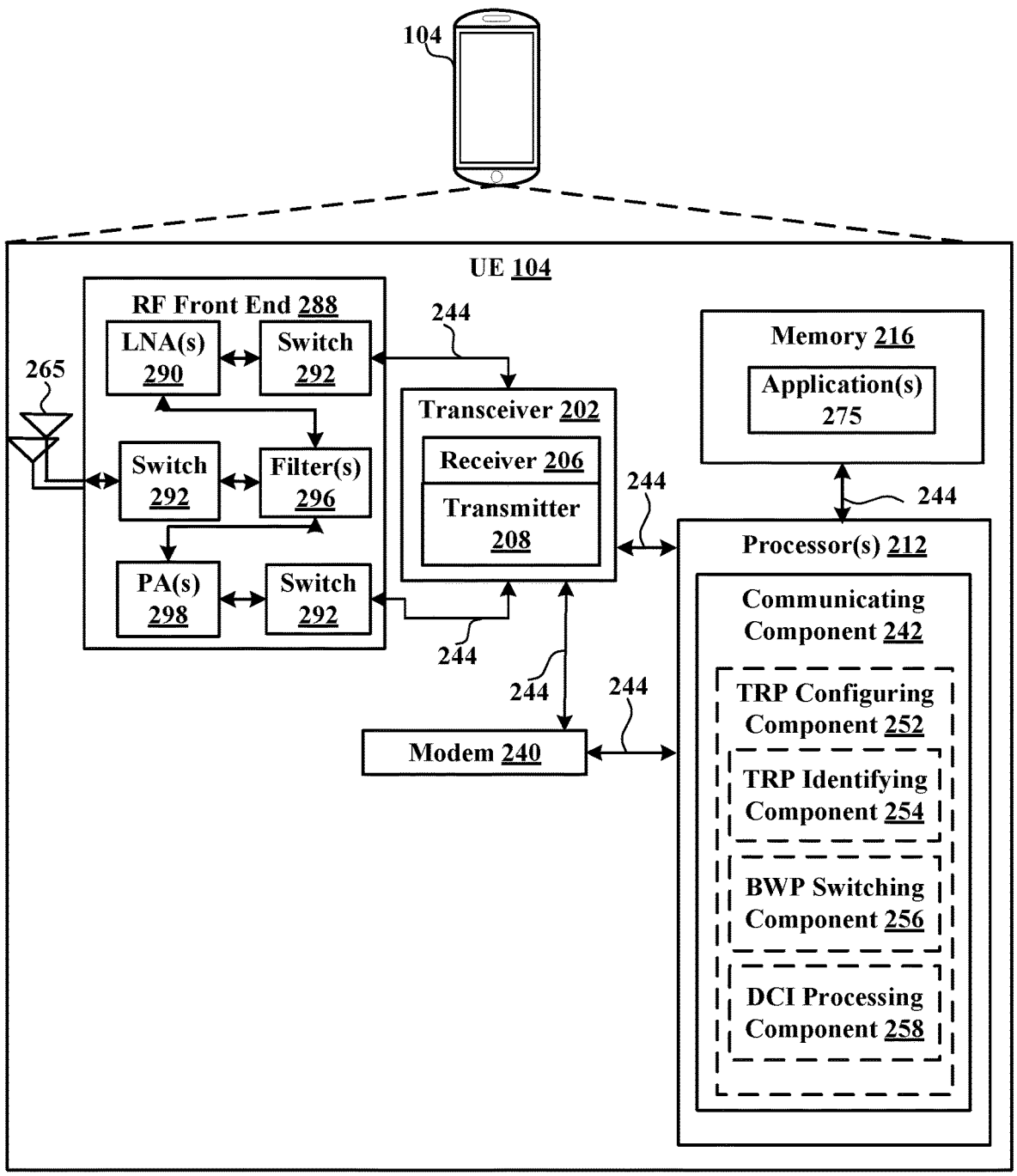
FIG. 2 is a block diagram illustrating an example of a UE, in accordance with various aspects of the present disclosure.
Figure 3:
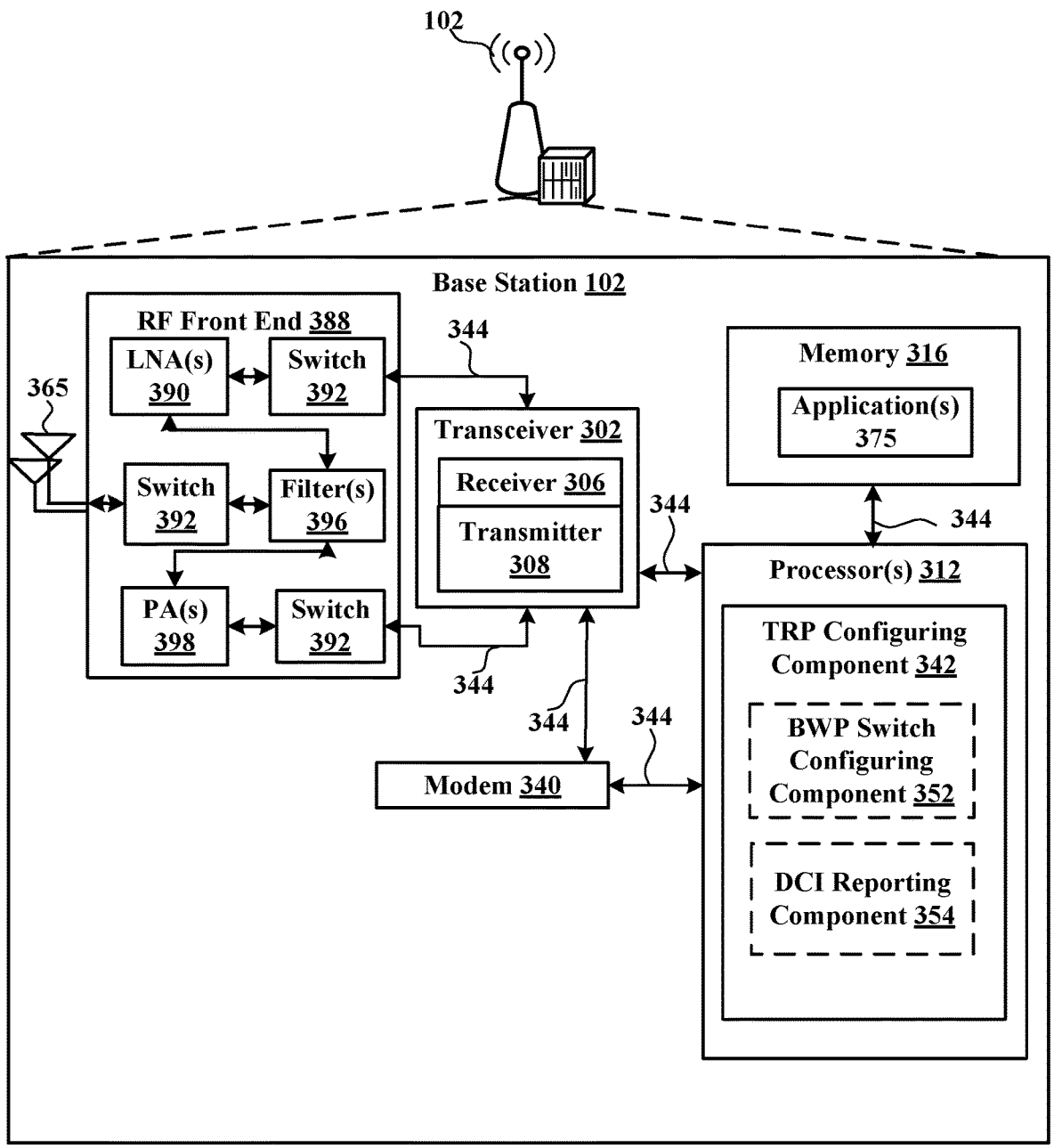
FIG. 3 is a block diagram illustrating an example of a base station, in accordance with various aspects of the present disclosure.
Figure 4:
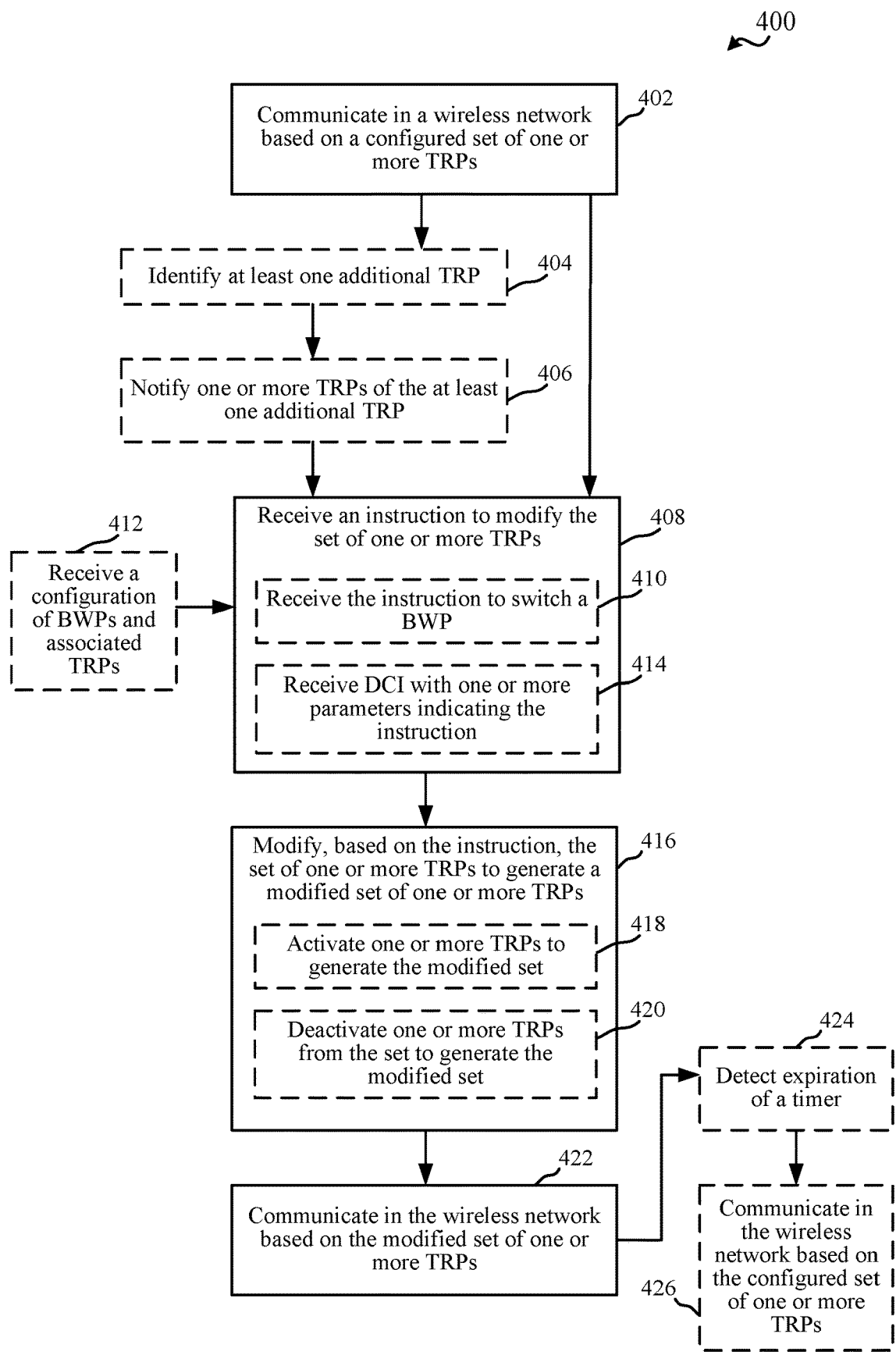
FIG. 4 is a flow chart illustrating an example of a method for communicating using one or multiple transmission points (TRPs), in accordance with various aspects of the present disclosure.
Figure 5:
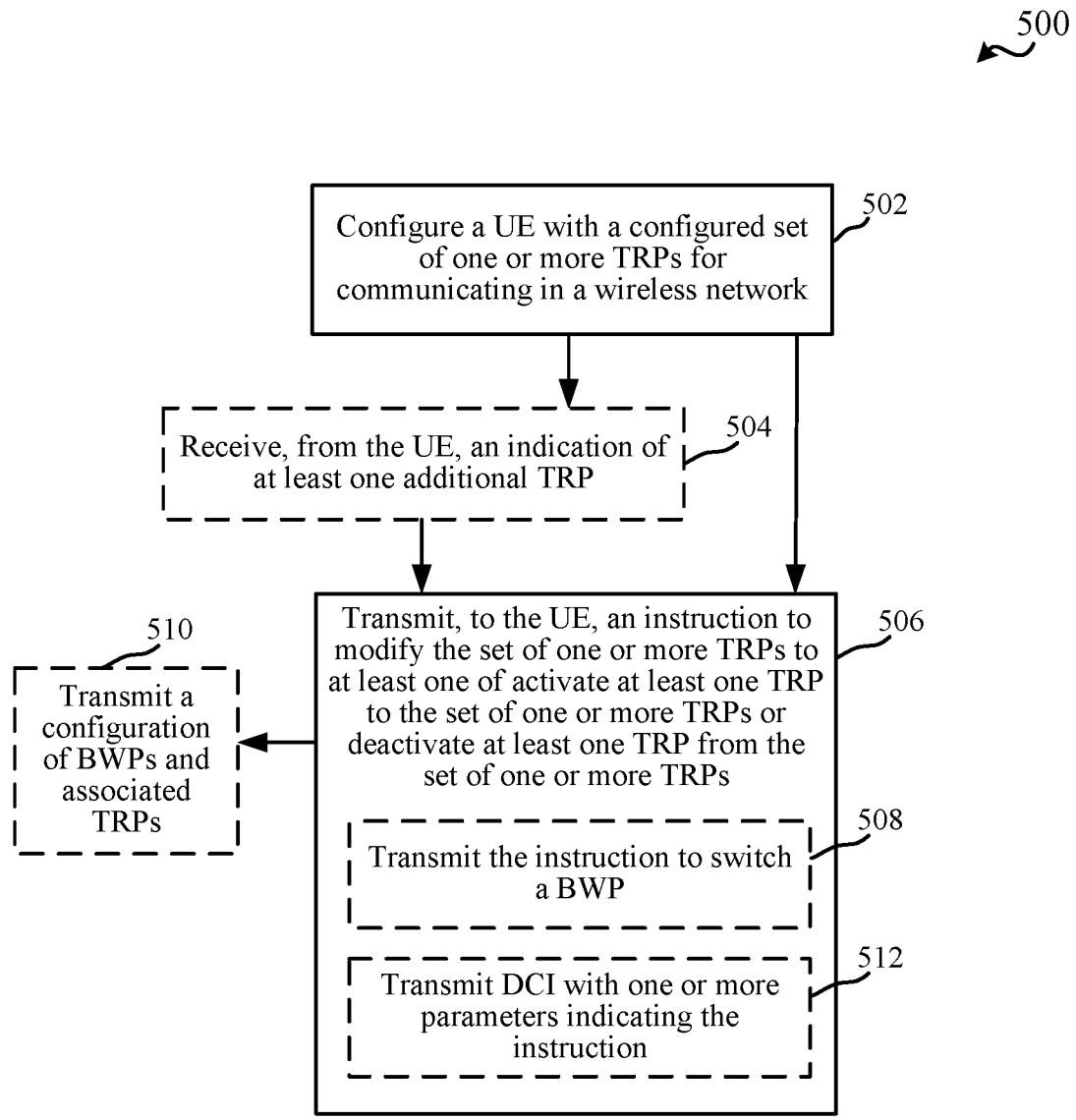
FIG. 5 is a flow chart illustrating an example of a method for configuring single-TRP or multi-TRP operations, in accordance with various aspects of the present disclosure.

Turning now to FIGS. 2-6, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 to enable communications with multiple TRPs.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a TRP configuring component 252 for configuring multi-TRP (or single-TRP) operations. TRP configuring component 252 may optionally include a TRP identifying component 254 for identifying and/or reporting identification of a TRP, a BWP switching component 256 for obtaining a configuration to switch BWPs for a CC, which may also indicate activation and/or deactivation of one or more TRPs, and/or a DCI processing component for processing received DCI, which may indicate activation and/or deactivation of one or more TRPs.

In an aspect, the processor(s) 212 may correspond to one or more of the processors described in connection with the UE in FIG. 6. Similarly, the memory 216 may correspond to the memory described in connection with the UE in FIG. 6.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and TRP configuring component 342 for configuring multiple TRPs for communicating with a UE 104.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, TRP configuring component 342 can optionally include a BWP switch configuring component 352 for configuring switching of a BWP of a CC with the UE 104, which can cause activation and/or deactivation of a TRP, and/or a DCI reporting component 354 for reporting DCI to the UE 104, which can cause activation and/or deactivation of a TRP.

In an aspect, the processor(s) 312 may correspond to one or more of the processors described in connection with the base station in FIG. 6. Similarly, the memory 316 may correspond to the memory described in connection with the base station in FIG. 6.

FIG. 4 illustrates a flow chart of an example of a method 400 for configuring multi-TRP (or single-TRP) operations. In an example, a UE 104 can perform the functions described in method 400 using one or more of the components described in FIGS. 1-2.

In method 400, at Block 402, a wireless network can be communicated in based on a configured set of one or more TRPs. In an aspect, communicating component 242, e.g., in conjunction with processor(s) 212, memory 216, transceiver 202, etc., can communicate in the wireless network based on a configured set of one or more TRPs. For example, the set of one or more TRPs can include a base station 102 (e.g., a gNB) serving the UE 104. In an example, UE 104 can initialize communications with the base station 102 at least in part by performing a random access channel (RACH) procedure with the base station 102. In addition, the set of one or more TRPs may include other gNBs and/or corresponding cells with which the UE 104 can communicate. In an example, the serving base station 102 can transmit a configuration of the set of one or more TRPs to the UE 104, which can include an initial configuration of the set of one or more TRPs, as described further herein. For example, the UE 104 can receive the configuration RRC signaling, MAC-CE, etc., from the base station 102.

In method 400, optionally at Block 404, at least one additional TRP can be identified. In an aspect, TRP identifying component 254, e.g., in conjunction with processor(s) 212, memory 216, transceiver 202, communicating component 242, TRP configuring component 252, etc., can identify the at least one additional TRP. For example, TRP identifying component 254 can identify the TRP as a neighboring base station transmitting signals received by the UE 104. For example, TRP identifying component 254 may identify the additional TRP based on a cell identifier or other identifier advertised in signaling from the additional TRP. For example, each TRP can be associated with a different cell identifier or the same cell identifier but located in difference places/panels. The TRPs may thus be differentiated based on cell identifier or another identifier (e.g., where the cell identifier is not signaled to the device), such as an implicit ControlResourceSet (CORESET) identifier advertised by the TRPs, transmission configuration indicator (TCI) state, etc. In addition, TRP identifying component 254 can identify the additional TRP based on a signal strength thereof achieving a threshold, based on other information advertised by the TRP, etc. The additional TRP can include another base station (e.g., gNB), another cell, a different type of access point, etc.

In method 400, optionally at Block 406, one or more TRPs can be notified of at least one additional TRP. In an aspect, TRP identifying component 254, e.g., in conjunction with processor(s) 212, memory 216, transceiver 202, communicating component 242, TRP configuring component 252, etc., can notify the one or more TRPs of the at least one additional TRP. For example, TRP identifying component 254 can notify one of the TRPs in the set of one or more TRPs (e.g., the serving base station 102) of the at least one additional TRP. In one example, this can include a request to add the at least one additional TRP to the set of TRPs for communicating in the wireless network. In an example, TRP identifying component 254 may identify multiple TRPs (e.g., based on different identifiers or other advertised parameters thereof) and may notify of the multiple TRPs for requesting activation of communications with all or a subset of the multiple TRPs.

In method 400, at Block 408, an instruction to modify the set of one or more TRPs can be received. In an aspect, TRP configuring component 252, e.g., in conjunction with processor(s) 212, memory 216, transceiver 202, communicating component 242, etc., can receive the instruction to modify the set of one or more TRPs. For example, TRP configuring component 252 may receive the instruction from one or more TRPs in the set of one or more TRPs with which wireless network communications are configured (e.g., a serving base station 102). In addition, the instruction may indicate to activate one or more TRPs for adding to the set (e.g., to generate a modified set of TRPs), deactivate one or more TRPs from the set (e.g., to generate the modified set), and/or the like. As such, for example, the instruction may identify the one or more TRPs for activating and/or deactivating communications therewith, which may be based on an associated identifier specified in the instruction. As described above, an identifier of the one or more TRPs may include a cell identifier, an identifier associated with a CORESET, etc. In one example, the instruction may be received in response to notifying of the at least one additional TRP and the instruction may relate to adding the at least one TRP to the set.

In receiving the instruction at Block 408, optionally at Block 410, the instruction to switch a BWP can be received. In an aspect, BWP switching component 256, e.g., in conjunction with processor(s) 212, memory 216, transceiver 202, communicating component 242, TRP configuring component 252, etc., can receive the instruction to switch the BWP. As described, the BWP can correspond to a CC configured for the UE 104 by one or more TRPs in the present set of TRP(s), where a CC can have multiple BWPs and a BWP can have multiple TRPs. In this regard, a base station 102 can configure BWPs to be used in a CC for communicating with a UE 104. In this example, base station 102 can configure single-TRP or multi-TRP operations (and/or correspondingly activate/deactivate TRPs) based on the BWP or BWPs configured.

In one example, in method 400, optionally at Block 412, a configuration of BWPs and associated TRPs can be received. In an aspect, BWP switching component 256, e.g., in conjunction with processor(s) 212, memory 216, transceiver 202, communicating component 242, TRP configuring component 252, etc., can receive the configuration of BWPs and associated TRPs. For example, BWP switching component 256 may receive the configuration of BWPs from a gNB (e.g., base station 102) or other network node, and the configuration may identify configurable BWPs (which can be dynamically switched between) and associated TRPs. As described further below, each BWP may be configured for either single-TRP or multi-TRP operation, and the configuration may accordingly identify the TRP(s) associated with each BWP. Moreover, as described, the identification of TRPs can be by way of an identifier of the TRP (e.g., an identifier associated with a CORESET) indicated in the BWP configuration for a given BWP. In one example, the UE 104 can receive this initial BWP configuration in RRC signaling, in a MAC-CE, etc., and/or can then receive dynamic BWP switching information (e.g., the instruction to switch at Block 410) in DCI from one or more base stations 102, as described further herein.

In a specific example, some BWPs may be configured to correspond to multi-TRP operations and some may correspond to single-TRP operations. In another example, one or more BWPs may relate to a different TRP than the serving base station 102, and thus multi-TRP operations can be configured by virtue of configuring BWPs corresponding to different TRPs. BWP switching component 256 can receive the instruction to switch one or more BWPs as part of DCI received from the base station 102 (e.g., in DCI, over a control channel, such as physical downlink control channel (PDCCH)). In addition, in an example, BWP switching command itself (e.g., regardless of the BWP or for a given BWP or set of BWPs configured) may indicate whether multi-TRP operations are enabled.

Moreover, in an example, the BWP switch (and thus the configuration of TRPs for multi-TRP operations) can be timer-based. In this example, BWP switching component 256 can operate using the switched BWP, as described below, based on a timer, after expiration of which, BWP switching component 256 can switch back to the original BWP and thus the original corresponding configuration of TRP(s) (e.g., as a single-TRP or multi-TRP operation).

In another example, in receiving the instruction at Block 408, optionally at Block 412, DCI with one or more parameters indicating the instruction can be received. In an aspect, DCI processing component 258, e.g., in conjunction with processor(s) 212, memory 216, transceiver 202, communicating component 242, TRP configuring component 252, etc., can receive the DCI with the one or more parameters indicating the instruction. For example, DCI processing component 258 can receive the DCI from a TRP, such as serving base station 102, and may receive the DCI over a PDCCH. In an example, the DCI may indicate the instruction to enable multi-TRP (or single-TRP) operations based on one or more parameters thereof, such as TCI state information, QCL configuration, etc. in the DCI. In one example, the UE 104 can receive (e.g., from serving base station 102 or otherwise a TRP in the initial set of TRP(s)), an initial TCI state or configuration of possible TCI states, which may include an initial QCL configuration or indication of possible QCL configurations.

In one example, for a Mode 1 configuration related to an ideal backhaul, a TCI state received in DCI from a base station 102 can point to one or more QCL relationships, where the QCL relationships may each indicate a set of one or more reference signals for the UE 104 to monitor. Where the TCI state points to multiple QCL relationships, this may indicate a multi-TRP configuration. For example, each set of reference signals can correspond to a different TRP the UE 104 can monitor. In another example, the QCL relationships can be used to specify a group or panel of TRPs with which to configure wireless communications (e.g., each QCL relationship can correspond to a certain group or panel of multiple, or singular, TRPs). Such a configuration can be used even if scheduling offset is below a threshold (e.g., the actual QCL used can fallback to a default one in this case, or a default pair, but DCI processing component 258 can still determine if the grant is single-TRP or multi-TRP).

In another example, for a Mode 2 configuration related to a non-ideal backhaul, each TRP can transmit its own DCI. In this example, DCI processing component 258 can process DCI from each of multiple TRPs and can determine whether to operate using single-TRP or multi-TRP, and/or with which TRPs to communicate, based on the TCI states of all detected DCIs and the corresponding QCL relationships.

In either case, the configuration of QCL groups (e.g., groups of possible QCL relationships) can also be used to set the TRP(s) to be activated/deactivated. For example, QCL group configuration can typically include RRC and/or MAC-CE configuration, as described, and TRP configuring component 252 can receive QCL group information deleting certain QCL relationships or corresponding TCI states in a new RRC/MAC-CE configuration, and can accordingly determine to activate or deactivate TRPs based on the added/deleted QCL groups or corresponding TCI states. For example, if for UE 104, candidate TRPs are to be switched from TRP set {1,2,3} to TRP set {2,3,4}, the received RRC/MAC-CE configuration can delete QCL groups and/or TCI states for TRP1 and can add QCL groups and/or TCI states for TRP4.

For example, determining whether the operate in single-TRP or multi-TRP, as described herein, can include determining whether a set of TRPs to be activated and/or deactivated results in a set of one TRP (thus single-TRP operations) or multiple TRPs (thus multi-TRP operation). In addition, for example, determining whether to operate in single-TRP or multi-TRP operations can include activating or deactivating communications with one or more TRPs, as described further below.

In method 400, at Block 416, the set of one or more TRPs can be modified, based on the instruction, to generate a modified set of one or more TRPs. In an aspect, TRP configuring component 252, e.g., in conjunction with processor(s) 212, memory 216, transceiver 202, communicating component 242, etc., can modify, based on the instruction, the set of one or more TRPs to generate a modified set of one or more TRPs. For example, TRP configuring component 252 can modify the set based at least in part on adding an identifier of a TRP to the set, deleting an identifier of the TRP from the set, and/or the like. The modified set can be used to determine the set of one or more TRPs with which to communicate in the wireless network, which may include communicating in a single-TRP configuration with one TRP, or in a multi-TRP configuration with multiple TRPs depending on the number of TRPs in the set. In addition, communicating with the set of TRP(s) can include monitoring for signals from the set of TRP(s), transmitting communications to the set of TRP(s), etc.

In an example, where the received instruction is an instruction to switch a BWP, TRP configuring component 252 can identify the TRPs associated with the switched BWP. In one example, the instruction may identify the BWP(s) for switching (e.g., using an identifier of the BWP(s), which can have been specified in the configuration of BWPs and associated TRPs received at Block 412). In this example, TRP configuring component 252 can determine the TRPs associated with the identified BWPs based on the received configuration (e.g., based on determining which TRPs are identified as associated with an identifier of the BWP(s) indicated in the instruction). TRP configuring component 252 can accordingly generate the modified set of one or more TRPs to include the identified TRPs such to facilitate communicating with the set of one or more TRPs as part of BWP switching.

In modifying the set of one or more TRPs at Block 416, optionally at Block 418, one or more TRPs can be activated to generate the modified set. In an aspect, TRP configuring component 252, e.g., in conjunction with processor(s) 212, memory 216, transceiver 202, communicating component 242, etc., can activate the one or more TRPs (e.g., activate communications with the one or more TRPs) to generate the modified set. In one example, activating the one or more TRPs can include adding an identifier of the TRP to the set, as described above. In addition, activating the one or more TRPs may include transmitting some sort of signaling to the one or more TRPs to indicate activation therewith (e.g., transmitting a RACH sequence thereto), monitoring for signals from the one or more TRPs, and/or the like. In an example, TRP configuring component 252 can determine whether to activate one or more TRPs based on comparing the set of one or more TRPs to one or more parameters in the instruction (e.g., an identifier of TRPs to add or of TRPs that are to be included in the set).

In modifying the set of one or more TRPs at Block 416, optionally at Block 420, one or more TRPs can be deactivated to generate the modified set. In an aspect, TRP configuring component 252, e.g., in conjunction with processor(s) 212, memory 216, transceiver 202, communicating component 242, etc., can deactivate the one or more TRPs (e.g., deactivate communications with the one or more TRPs) to generate the modified set. In one example, deactivating the one or more TRPs can include removing an identifier of the TRP from the set, as described above. In addition, deactivating the one or more TRPs may include transmitting some sort of signaling to the one or more TRPs to indicate deactivation therewith, refraining from monitoring for signals from the one or more TRPs, and/or the like. In an example, TRP configuring component 252 can determine whether to deactivate one or more TRPs based on comparing the set of one or more TRPs to one or more parameters in the instruction (e.g., an identifier of TRPs to remove or of TRPs that are to be included in the set).

In method 400, at Block 422, the modified set of one or more TRPs can be communicated with in the wireless network. In an aspect, communicating component 242, e.g., in conjunction with processor(s) 212, memory 216, transceiver 202, etc., can communicate in the wireless network based on the modified set of one or more TRPs. As described, communicating with the modified set of one or more TRPs can include monitoring for signals received from each of the TRP(s) in the modified set, transmitting communications to each of the TRP(s) in the modified set, etc. In one example, communicating component 242 can continue communicating with the modified set of one or more TRPs until another modification instruction is received.

In another example, in method 400, optionally at Block 424, expiration of a timer can be detected after communicating based on the modified set of one or more TRPs. In an aspect, TRP configuring component 252, e.g., in conjunction with processor(s) 212, memory 216, transceiver 202, communicating component 242, etc., can detect expiration of the timer. As described, for example, communicating with the modified set of one or more TRPs may be timer-based such that TRP configuring component 252 can initialize a timer based on modifying the set at Block 416 (e.g., at least for multi-TRP operation), based on communicating with the modified set of TRPs at Block 422, etc. In one example, however, the timer can be a timer to ensure the modified set of one or more TRPs are properly configured, and thus may cancel or reset upon receiving communications from the set of one or more TRPs (e.g., over the associated BWP, etc.).

In any case, where expiration of the timer is detected at Block 424, optionally at Block 426 the configured set of one or more TRPs can be communicated with in the wireless network. In an aspect, communicating component 242, e.g., in conjunction with processor(s) 212, memory 216, transceiver 202, etc., can communicate in the wireless network based on the configured set of one or more TRPs (e.g., the originally configured set used at Block 402). For example, TRP configuring component 252, in this example, can activate communications with one or more TRPs in the configured set and/or deactivate communications with one or more TRPs in the modified set, as described above.

FIG. 5 illustrates a flow chart of an example of a method 500 for configuring single-TRP or multi-TRP operations for a UE 104. In an example, a base station 102 (e.g., which may include a gNB 180) can perform the functions described in method 500 using one or more of the components described in FIGS. 1 and 3.

In method 500, at Block 502, a UE can be configured with a configured set of one or more TRPs for communicating in a wireless network. In an aspect, TRP configuring component 342, e.g., in conjunction with processor(s) 312, memory 316, transceiver 302, etc., can configure the UE (e.g., UE 104) with the configured set of one or more TRPs for communicating in the wireless network. For example, the configured set of one or more TRPs can include base station 102 and/or additional TRPs. The configuration may result from a RACH procedure performed by the UE 104 to communicate with the base station 102, for example. In addition, the set of one or more TRPs may include other gNBs and/or corresponding cells with which the UE 104 can communicate. In an example, the serving base station 102 can transmit a configuration of the set of one or more TRPs to the UE 104, which can include an initial configuration of the set of one or more TRPs, as described further herein. For example, the base station 102 can transmit the configuration using RRC signaling, MAC-CE, etc.

In method 500, optionally at Block 504, an indication of at least one additional TRP can be received from the UE. In an aspect, TRP configuring component 342, e.g., in conjunction with processor(s) 312, memory 316, transceiver 302, etc., can receive, from the UE (e.g., UE 104), the indication of the at least one additional TRP. For example, as described, the UE 104 can discover the at least one additional TRP and/or can determine that communicating with the at least one additional TRP may be desirable (e.g., where signal properties of the additional TRP achieve a threshold), and/or the like. In an example, TRP configuring component 342 may receive the indication in a measurement report or other communication from the UE 104 over a control channel (e.g., physical uplink control channel (PUCCH)).

In method 500, at Block 506, an instruction can be transmitted to the UE to modify the set of one or more TRPs to at least one of activate at least one TRP to the set of one or more TRPs or deactivate at least one TRP from the set of one or more TRPs. In an aspect, TRP configuring component 342, e.g., in conjunction with processor(s) 312, memory 316, transceiver 302, etc., can transmit, to the UE (e.g., UE 104), the instruction to modify the set of one or more TRPs to at least one of activate communications with at least one TRP to the set of one or more TRPs or deactivate communications with the at least one TRP form the set of one or more TRPs. In an example, TRP configuring component 342 can determine to modify the set based on the indication received from the UE of the additional TRP. In another example, TRP configuring component 342 can determine to modify the set based on one or more metrics of communications with the UE 104 (e.g., throughput, buffer status report (BSR), etc.) and based on knowledge of additional TRPs in the vicinity of the UE 104, such to provide additional throughput for the UE 104 by activating a TRP or recall the throughput when no longer needed by deactivating a TRP, etc.

In any case, for example, TRP configuring component 342 can indicate, in the instruction, an identifier of one or more TRPs to add or activate and/or one or more TRPs to remove or deactivate. In another example, TRP configuring component 342 can indicate, in the instruction, identifier(s) of TRPs to be in the active set for the UE 104, and can rely on the UE 104 to determine which to activate and/or deactivate by comparing with the current set. As described above, TRP configuring component 342 can use various signaling possibilities to indicate the instruction (e.g., RRC signaling, MAC-CE, DCI, etc., as described herein).

In one example, in transmitting the instruction at Block 506, optionally at Block 508, the instruction can be transmitted to switch a BWP. In an aspect, BWP switch configuring component 352, e.g., in conjunction with processor(s) 312, memory 316, transceiver 302, TRP configuring component 342 etc., can transmit the instruction to switch the BWP. For example, BWP switch configuring component 352 can transmit the instruction in a BWP switching command, which can be sent via DCI. As described, different BWPs can relate to different TRPs and/or independently to multi-TRP or single-TRP configurations. In another example, as described, a command for switching BWP may include an indication of whether the BWP is for multi-TRP or single-TRP operations. In any case, BWP switch configuring component 352 can indicate the BWP switch to indicate a switch to multi-TRP or single-TRP operations, or to a different set of TRPs, as compared to a current set of TRP(s). In one example, the BWP can implicitly identify the TRPs with which the UE 104 is to communicate, as described.

For example, in method 500, optionally at Block 510, a configuration of BWPs and associated TRPs can be transmitted. In an aspect, BWP switch configuring component 352, e.g., in conjunction with processor(s) 312, memory 316, transceiver 302, TRP configuring component 342 etc., can transmit the configuration of BWPs and associated TRPs. For example, as described above, the configuration of BWPs can indicate an identifier of a BWP and also associated TRP(s) (which may include indicating identifiers of the associated TRP(s)). In this example, BWP switch configuring component 342 may transmit the configuration of BWPs and associated TRPs to one or more UEs (e.g., UE 104), which may include transmitting using RRC signaling, MAC-CE, etc. In transmitting the instruction to switch the BWP at Block 508, BWP switch configuring component 352 can transmit an identifier of the BWP to which to switch, which can facilitate the UE 104 identifying the associated TRP(s) via the received configuration. In this example, BWP switch configuring component 352 can transmit the instruction to switch the BWP in DCI, as described.

In one example, in transmitting the instruction at Block 506, optionally at Block 512, DCI with one or more parameters indicating the instruction can be transmitted. In an aspect, TRP configuring component 342, e.g., in conjunction with processor(s) 312, memory 316, transceiver 302, etc., can transmit DCI with the one or more parameters indicating the instruction. For example, as described, TRP configuring component 342 can utilize TCI states in DCI to indicate single-TRP or multi-TRP operations (e.g., based on one or more QCL relationships related to a TCI state). Moreover, as described, base station 102 can configure initial TCI states, corresponding QCL relationships, etc. via RRC/MAC-CE scheduling, and can use DCI to dynamically modify TCI state, select QCL relationships, etc. to also modify whether single-TRP or multi-TRP operations are enabled, modify the list of TRPs with which to communicate, and/or the like. In one example, the QCL relationships can implicitly identify the TRPs with which the UE 104 is to communicate, as described.

In any case, for example as described, the UE 104 can communicate using a set of one or more TRPs that is based on the transmitted instruction.

Figure 6:
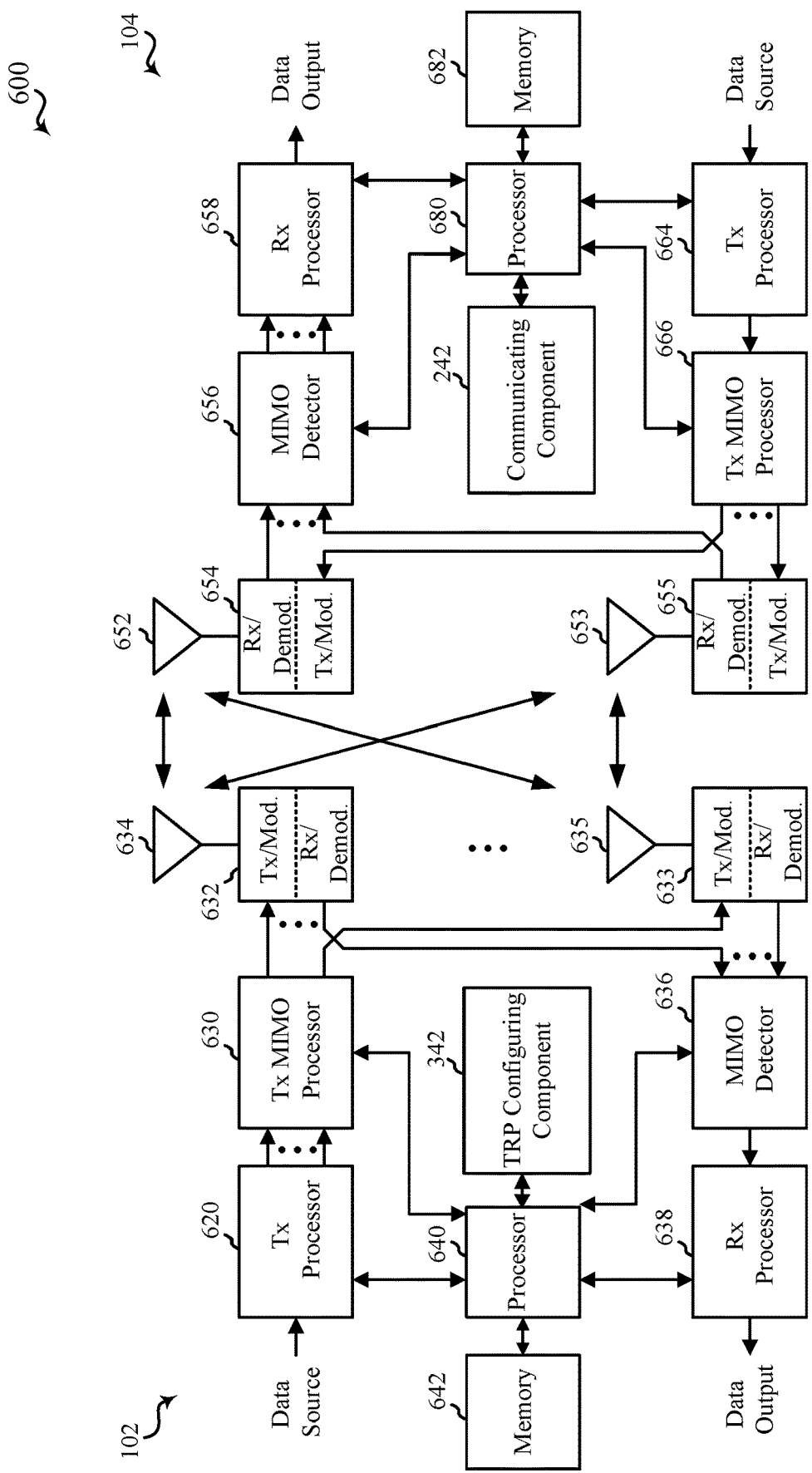
FIG. 6 is a block diagram illustrating an example of a MIMO communication system including a base station and a UE, in accordance with various aspects of the present disclosure.

FIG. 6 is a block diagram of a MIMO communication system 600 including a base station 102 and a UE 104. The MIMO communication system 600 may illustrate aspects of the wireless communication access network 100 described with reference to FIG. 1. The base station 102 may be an example of aspects of the base station 102 described with reference to FIG. 1. The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 104 may be an example of aspects of the UEs 104 described with reference to FIGS. 1-2. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a communicating component 242 (see e.g., FIGS. 1 and 2).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a TRP configuring component 342 (see e.g., FIGS. 1 and 3).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 600. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 600.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples is provided:

1. A method of wireless communication, comprising:
communicating in a wireless network based on a configured set of one or more transmission points (TRPs);
receiving an instruction to modify the set of one or more TRPs, wherein receiving the instruction comprises receiving the instruction to switch a bandwidth part (BWP) used to communicate in the wireless network, wherein the BWP corresponds to modifying the set of one or more TRPs;
modifying, based on the instruction to switch the BWP, the set of one or more TRPs to generate a modified set of one or more TRPs; and
communicating in the wireless network based on the modified set of one or more TRPs.

2. The method of example 1, wherein modifying the set of one or more TRPs includes, based on receiving the instruction to switch the BWP, at least one of activating communications with at least one TRP to generate the modified set of one or more TRPs or deactivating communications with at least one TRP in the configured set of one or more TRPs to generate the modified set of one or more TRPs.

3. The method of example 2, wherein the BWP corresponds to multiple TRPs, and wherein modifying the set of one or more TRPs includes activating or deactivating communications with the at least one TRP to generate the modified set of one or more TRPs to include the multiple TRPs.

4. The method of any of examples 1 to 3, wherein the instruction includes identifiers associated with a control resource set (CORESET) to indicate the set of one or more TRPs, and wherein modifying the set of one or more TRPs is based on the identifiers associated with the CORESET.

5. The method of any of examples 1 to 4, wherein modifying the set of one or more TRPs includes modifying the set of one or more TRPs to generate the modified set of one or more TRPs to use based on a timer value, and further comprising communicating in the wireless network, after expiration of the timer value, using the configured set of one or more TRPs.

6. The method of any of examples 1 to 5, wherein receiving the instruction comprises receiving downlink control information (DCI) indicating the instruction to switch the BWP.

7. The method of any of examples 1 to 6, further comprising:
identifying at least one additional TRP; and
notifying one or more TRPs in the configured set of one or more TRPs of the at least one additional TRP,
wherein the instruction to modify the set of one or more TRPs indicates to activate the at least one additional TRP, and wherein modifying the set of one or more TRPs includes activating the at least one additional TRP in the modified set of one or more TRPs.

8. An apparatus for wireless communication, comprising:
a transceiver;
a memory configured to store instructions related to configuring a set of one or more transmission points (TRPs); and
one or more processors communicatively coupled with the transceiver and the memory, wherein the one or more processors are configured to:
communicate in a wireless network based on a configured set of one or more transmission points (TRPs);
receive an instruction to modify the set of one or more TRPs, wherein receiving the instruction comprises receiving the instruction to switch a bandwidth part (BWP) used to communicate in the wireless network, wherein the BWP corresponds to modifying the set of one or more TRPs;

modify, based on the instruction to switch the BWP, the set of one or more TRPs to generate a modified set of one or more TRPs; and communicate in the wireless network based on the modified set of one or more TRPs.

9. The apparatus of example 8, wherein the one or more processors are configured to modify the set of one or more TRPs at least in part by, based on receiving the instruction to switch the BWP, at least one of activating communications with at least one TRP to generate the modified set of one or more TRPs or deactivating communications with at least one TRP in the configured set of one or more TRPs to generate the modified set of one or more TRPs.

10. The apparatus of example 9, wherein the BWP corresponds to multiple TRPs, and wherein the one or more processors are configured to modify the set of one or more TRPs at least in part by activating or deactivating communications with the at least one TRP to generate the modified set of one or more TRPs to include the multiple TRPs.

11. The apparatus of any of examples 8 to 10, wherein the instruction includes identifiers associated with a control resource set (CORESET) to indicate the set of one or more TRPs, and wherein the one or more processors are configured to modify the set of one or more TRPs based on the identifiers associated with the CORESET.

12. The apparatus of any of examples 8 to 11, wherein the one or more processors are configured to modify the set of one or more TRPs to generate the modified set of one or more TRPs to use based on a timer value, and wherein the one or more processors are further configured to communicate in the wireless network, after expiration of the timer value, using the configured set of one or more TRPs.

13. The apparatus of any of examples 8 to 12, wherein the one or more processors are configured to receive the instruction in downlink control information (DCI) indicating the instruction to switch the BWP.

14. The apparatus of any of examples 8 to 13, wherein the one or more processors are further configured to:

identify at least one additional TRP; and notify one or more TRPs in the configured set of one or more TRPs of the at least one additional TRP, wherein the instruction to modify the set of one or more TRPs indicates to activate the at least one additional TRP, and wherein the one or more processors are configured to modify the set of one or more TRPs at least in part by activating the at least one additional TRP in the modified set of one or more TRPs.

15. An apparatus for wireless communication, comprising:

means for communicating in a wireless network based on a configured set of one or more transmission points (TRPs);

means for receiving an instruction to modify the set of one or more TRPs, wherein receiving the instruction comprises receiving the instruction to switch a bandwidth part (BWP) used to communicate in the wireless network, wherein the BWP corresponds to modifying the set of one or more TRPs;

means for modifying, based on the instruction to switch the BWP, the set of one or more TRPs to generate a modified set of one or more TRPs; and means for communicating in the wireless network based on the modified set of one or more TRPs.

16. A computer-readable medium, comprising code executable by one or more processors for wireless communications, the code comprising code for:

communicating in a wireless network based on a configured set of one or more transmission points (TRPs);

receiving an instruction to modify the set of one or more TRPs, wherein receiving the instruction comprises receiving the instruction to switch a bandwidth part (BWP) used to communicate in the wireless network, wherein the BWP corresponds to modifying the set of one or more TRPs;

modifying, based on the instruction to switch the BWP, the set of one or more TRPs to generate a modified set of one or more TRPs; and communicating in the wireless network based on the modified set of one or more TRPs.

17. A method of wireless communication, comprising:

configuring a user equipment (UE) with a configured set of one or more transmission points (TRPs) for communicating in a wireless network; and transmitting, to the UE, an instruction to modify the set of one or more TRPs to at least one of activate communications with at least one TRP to the set of one or more TRPs or deactivate communications with at least one TRP from the set of one or more TRPs, wherein transmitting the instruction includes transmitting the instruction to switch a bandwidth part (BWP) used to communicate in the wireless network, wherein the BWP corresponds to a single TRP or multiple TRPs.

18. The method of example 17, wherein the instruction includes identifiers associated with a control resource set (CORESET) to indicate the at least one TRP.

19. The method of any of examples 17 or 18, wherein the instruction relates to activating communications with the at least one TRP where the BWP corresponds to the multiple TRPs.

20. The method of any of examples 17 to 19, wherein the instruction relates to deactivating communications with the at least one TRP where the BWP corresponds to the single TRP.

21. The method of any of examples 17 to 20, wherein transmitting the instruction includes transmitting the instruction in downlink control information (DCI) in a downlink control channel.

22. The method of any of examples 17 to 21, further comprising receiving, from the UE, an indication of the at least one additional TRP, wherein transmitting the instruction to modify the set of one or more TRPs is based on receiving the indication.

23. An apparatus for wireless communication, comprising:

a transceiver;

a memory configured to store instructions related to configuring a set of one or more transmission points (TRPs); and one or more processors communicatively coupled with the transceiver and the memory, wherein the one or more processors are configured to:

configure a user equipment (UE) with a configured set of one or more transmission points (TRPs) for communicating in a wireless network; and transmit, to the UE, an instruction to modify the set of one or more TRPs to at least one of activate communications with at least one TRP to the set of one or more TRPs or deactivate communications with at least one TRP from the set of one or more TRPs, wherein the one or more processors are configured to transmit the instruction to switch a bandwidth part (BWP) used to communicate in the wireless network, wherein the BWP corresponds to a single TRP or multiple TRPs.

24. The apparatus of example 23, wherein the instruction includes identifiers associated with a control resource set (CORESET) to indicate the at least one TRP.

25. The apparatus of any of examples 23 or 24, wherein the instruction relates to activating communications with the at least one TRP where the BWP corresponds to the multiple TRPs.

26. The apparatus of any of examples 23 to 25, wherein the instruction relates to deactivating communications with the at least one TRP where the BWP corresponds to the single TRP.

27. The apparatus of any of examples 23 to 26, wherein the one or more processors are configured to transmit the instruction in downlink control information (DCI) in a downlink control channel.

28. The apparatus of any of examples 23 to 27, wherein the one or more processors are further configured to receive, from the UE, an indication of the at least one additional TRP, wherein the one or more processors are configured to transmit the instruction to modify the set of one or more TRPs based on receiving the indication.

29. An apparatus for wireless communication, comprising:
means for configuring a user equipment (UE) with a configured set of one or more transmission points (TRPs) for communicating in a wireless network; and
means for transmitting, to the UE, an instruction to modify the set of one or more TRPs to at least one of activate communications with at least one TRP to the set of one or more TRPs or deactivate communications with at least one TRP from the set of one or more TRPs,
wherein the means for transmitting transmits the instruction to switch a bandwidth part (BWP) used to communicate in the wireless network, wherein the BWP corresponds to a single TRP or multiple TRPs.

30. A computer-readable medium, comprising code executable by one or more processors for wireless communications, the code comprising code for:
configuring a user equipment (UE) with a configured set of one or more transmission points (TRPs) for communicating in a wireless network; and
transmitting, to the UE, an instruction to modify the set of one or more TRPs to at least one of activate communications with at least one TRP to the set of one or more TRPs or deactivate communications with at least one TRP from the set of one or more TRPs, wherein the code for transmitting transmits the instruction to switch a bandwidth part (BWP) used to communicate in the wireless network, wherein the BWP corresponds to a single TRP or multiple TRPs.

What is claimed is:

1. A method of wireless communication, comprising:
communicating, by a user equipment (UE), with a configured set of one or more transmission points (TRPs) in a wireless network;
identifying, by the UE, at least one additional TRP transmitting signals received by the UE;
notifying, by the UE, one or more of the TRPs in the configured set of one or more TRPs of the at least one additional TRP;
receiving an instruction to switch a bandwidth part (BWP) used to communicate in the wireless network to a different BWP;
identifying, based on the instruction to switch the BWP, a set of one or more TRPs associated with the different BWP, wherein the set of one or more TRPs identified based on the instruction to switch the BWP is different than the configured set of one or more TRPs;
modifying, based on the instruction to switch the BWP, the configured set of one or more TRPs to generate a modified set of one or more TRPs including the set of one or more TRPs associated with the different BWP, wherein modifying the configured set of one or more TRPs includes generating the modified set of one or more TRPs to at least one of add at least one TRP from the set of one or more TRPs that is not in the configured set of one or more TRPs or remove at least one TRP from the configured set of one or more TRPs that is not in the set of one or more TRPs; and
communicating, by the UE, with the modified set of one or more TRPs in the wireless network.

2. The method of claim 1, wherein modifying the configured set of one or more TRPs to generate the modified set of one or more TRPs to add the at least one TRP from the set of one or more TRPs includes activating communications with the at least one TRP, or wherein modifying the configured set of one or more TRPs to generate the modified set of one or more TRPs to remove the at least one TRP from the configured set of one or more TRPs includes deactivating communications with the at least one TRP.

3. The method of claim 2, wherein the different BWP corresponds to multiple TRPs, and wherein modifying the configured set of one or more TRPs includes activating or deactivating communications with the at least one TRP to generate the modified set of one or more TRPs to include the multiple TRPs.

4. The method of claim 1, wherein the instruction includes identifiers associated with a control resource set (CORESET) to indicate the set of one or more TRPs associated with the different BWP, and wherein modifying the configured set of one or more TRPs is based on the identifiers associated with the CORESET.

5. The method of claim 1, wherein modifying the set of one or more TRPs includes modifying the configured set of one or more TRPs to generate the modified set of one or more TRPs to use based on a timer value, and wherein communicating with the modified set of one or more TRPs in the wireless network occurs after expiration of the timer value.

6. The method of claim 1, wherein receiving the instruction comprises receiving downlink control information (DCI) indicating the instruction to switch the BWP.

7. The method of claim 1,
wherein the instruction to switch the BWP indicates to activate communications with the at least one additional TRP, and wherein modifying the configured set of one or more TRPs includes activating communications with the at least one additional TRP in the modified set of one or more TRPs.

8. An apparatus for wireless communication, comprising:
a transceiver;
a memory configured to store instructions related to configuring a set of one or more transmission points (TRPs); and
one or more processors communicatively coupled with the transceiver and the memory, wherein the one or more processors are configured to:
communicate, by the apparatus, with a configured set of one or more transmission points (TRPs) in a wireless network;
identify, by the apparatus, at least one additional TRP transmitting signals received by the apparatus;
notify, by the apparatus, one or more of the TRPs in the configured set of one or more TRPs of the at least one additional TRP;

receive an instruction to switch a bandwidth part (BWP) used to communicate in the wireless network to a different BWP;

identifying, based on the instruction to switch the BWP, a set of one or more TRPs associated with the different BWP, wherein the set of one or more TRPs identified based on the instruction to switch the BWP is different than the configured set of one or more TRPs;

modify, based on the instruction to switch the BWP, the configured set of one or more TRPs to generate a modified set of one or more TRPs including the set of one or more TRPs associated with the different BWP, wherein the one or more processors are configured to modify the configured set of one or more TRPs at least in part by generating the modified set of one or more TRPs to at least one of add at least one TRP from the set of one or more TRPs that is not in the configured set of one or more TRPs or remove at least one TRP from the configured set of one or more TRPs that is not in the set of one or more TRPs; and communicate, by the apparatus, with the modified set of one or more TRPs in the wireless network.

9. The apparatus of claim 8, wherein the one or more processors are configured to modify the configured set of one or more TRPs to generate the modified set of one or more TRPs to add the at least one TRP from the set of one or more TRPs at least in part by activating communications with the at least one TRP, or wherein the one or more processors are configured to modify the configured set of one or more TRPs to generate the modified set of one or more TRPs to remove the at least one TRP from the configured set of one or more TRPs at least in part by deactivating communications with at least one TRP in the configured set of one or more TRPs.

10. The apparatus of claim 9, wherein the different BWP corresponds to multiple TRPs, and wherein the one or more processors are configured to modify the configured set of one or more TRPs at least in part by activating or deactivating communications with the at least one TRP to generate the modified set of one or more TRPs to include the multiple TRPs.

11. The apparatus of claim 8, wherein the instruction includes identifiers associated with a control resource set (CORESET) to indicate the set of one or more TRPs associated with the different BWP, and wherein the one or more processors are configured to modify the configured set of one or more TRPs based on the identifiers associated with the CORESET.

12. The apparatus of claim 8, wherein the one or more processors are configured to modify the configured set of one or more TRPs to generate the modified set of one or more TRPs to use based on a timer value, and wherein the one or more processors are configured to communicate with the modified set of one or more TRPs in the wireless after expiration of the timer value.

13. The apparatus of claim 8, wherein the one or more processors are configured to receive the instruction in downlink control information (DCI) indicating the instruction to switch the BWP.

14. The apparatus of claim 8, wherein the instruction to switch the BWP indicates to activate communications with the at least one additional TRP, and wherein the one or more processors are configured to modify the configured set of one or more TRPs at least in part by activating communications with the at least one additional TRP in the modified set of one or more TRPs.

15. An apparatus for wireless communication, comprising:

means for communicating, by the apparatus, with a configured set of one or more transmission points (TRPs) in a wireless network;

means for identifying, by the apparatus, at least one additional TRP transmitting signals received by the apparatus;

means for notifying, by the apparatus, one or more of the TRPs in the configured set of one or more TRPs of the at least one additional TRP;

means for receiving an instruction to switch a bandwidth part (BWP) used to communicate in the wireless network to a different BWP;

means for identifying, based on the instruction to switch the BWP, a set of one or more TRPs associated with the different BWP, wherein the set of one or more TRPs identified based on the instruction to switch the BWP are different than the configured set of one or more TRPs;

means for modifying, based on the instruction to switch the BWP, the configured set of one or more TRPs to generate a modified set of one or more TRPs including the set of one or more TRPs associated with the different BWP, wherein modifying the configured set of one or more TRPs includes generating the modified set of one or more TRPs to at least one of add at least one TRP from the set of one or more TRPs that is not in the configured set of one or more TRPs or remove at least one TRP from the configured set of one or more TRPs that is not in the set of one or more TRPs; and means for communicating, by the apparatus, with the modified set of one or more TRPs in the wireless network.

16. A non-transitory computer-readable medium, comprising code executable by one or more processors for wireless communications, the code comprising code for:

communicating, by a user equipment (UE), with a configured set of one or more transmission points (TRPs) in a wireless network;

identifying, by the UE, at least one additional TRP transmitting signals received by the UE;

notifying, by the UE, one or more of the TRPs in the configured set of one or more TRPs of the at least one additional TRP;

receiving an instruction to switch a bandwidth part (BWP) used to communicate in the wireless network to a different BWP;

identifying, based on the instruction to switch the BWP, a set of one or more TRPs associated with the different BWP, wherein the set of one or more TRPs identified based on the instruction to switch the BWP are different than the configured set of one or more TRPs;

modifying, based on the instruction to switch the BWP, the configured set of one or more TRPs to generate a modified set of one or more TRPs including the set of one or more TRPs associated with the different BWP, wherein modifying the configured set of one or more TRPs includes generating the modified set of one or more TRPs to at least one of add at least one TRP from the set of one or more TRPs that is not in the configured set of one or more TRPs or remove at least one TRP from the configured set of one or more TRPs that is not in the set of one or more TRPs; and communicating, by the UE, with the modified set of one or more TRPs in the wireless network.

17. A method of wireless communication, comprising:
configuring a user equipment (UE) with a configured set of one or more transmission points (TRPs) for communicating in a wireless network;
receiving, from the UE, identification of at least one additional TRP transmitting signals received by the UE;
transmitting, to the UE, an instruction to switch a bandwidth part (BWP) used to communicate in the wireless network to a different BWP, wherein the different BWP is associated with a second set of one or more TRPs that at least one of includes at least one TRP that is not in the configured set of one or more TRPs causing the UE to activate communications with the at least one TRP or does not include at least one TRP that is in the configured set of one or more TRPs causing the UE to deactivate communications with the at least one TRP, and wherein the different BWP is associated with a single TRP or multiple TRPs.

18. The method of claim 17, wherein the instruction includes identifiers associated with a control resource set (CORESET) to indicate the at least one TRP associated with the different BWP.

19. The method of claim 17, wherein the instruction relates to activating communications with the at least one TRP where the different BWP is associated with the multiple TRPs.

20. The method of claim 17, wherein the instruction relates to deactivating communications with the at least one TRP where the different BWP corresponds to the single TRP.

21. The method of claim 17, wherein transmitting the instruction includes transmitting the instruction in downlink control information (DCI) in a downlink control channel.

22. The method of claim 17, further comprising receiving, from the UE, an indication of the at least one TRP, wherein transmitting the instruction is based on receiving the indication.

23. An apparatus for wireless communication, comprising:
a transceiver;
a memory configured to store instructions related to configuring a set of one or more transmission points (TRPs); and
one or more processors communicatively coupled with the transceiver and the memory, wherein the one or more processors are configured to:
configure a user equipment (UE) with a configured set of one or more transmission points (TRPs) for communicating in a wireless network;
receive, from the UE, identification of at least one additional TRP transmitting signals received by the UE;
transmit, to the UE, an instruction to switch a bandwidth part (BWP) used to communicate in the wireless network to a different BWP, wherein the different BWP is associated with a second set of one or more TRPs that at least one of includes at least one TRP that is not in the configured set of one or more TRPs causing the UE to activate communications with the at least one TRP associated or does not include at least one TRP that is in the configured set of one or more TRPs causing the UE to deactivate communications with the at least one TRP, and wherein the different BWP is associated with a single TRP or multiple TRPs.

24. The apparatus of claim 23, wherein the instruction includes identifiers associated with a control resource set (CORESET) to indicate the at least one TRP.

25. The apparatus of claim 23, wherein the instruction relates to activating communications with the at least one TRP where the different BWP corresponds to the multiple TRPs.

26. The apparatus of claim 23, wherein the instruction relates to deactivating communications with the at least one TRP where the different BWP corresponds to the single TRP.

27. The apparatus of claim 23, wherein the one or more processors are configured to transmit the instruction in downlink control information (DCI) in a downlink control channel.

28. The apparatus of claim 23, wherein the one or more processors are further configured to receive, from the UE, an indication of the at least one TRP, wherein the one or more processors are configured to transmit the instruction based on receiving the indication.

29. An apparatus for wireless communication, comprising:
means for configuring a user equipment (UE) with a configured set of one or more transmission points (TRPs) for communicating in a wireless network;
means for receiving, from the UE, identification of at least one additional TRP transmitting signals received by the UE;
means for transmitting, to the UE, an instruction to switch a bandwidth part (BWP) used to communicate in the wireless network to a different BWP, wherein the different BWP is associated with a second set of one or more TRPs that at least one of includes at least one TRP that is not in the configured set of one or more TRPs causing the UE to activate communications with the at least one TRP or does not include at least one TRP that is in the configured set of one or more TRPs causing the UE to deactivate communications with the at least one TRP, and wherein the different BWP is associated with a single TRP or multiple TRPs.

30. A non-transitory computer-readable medium, comprising code executable by one or more processors for wireless communications, the code comprising code for:
configuring a user equipment (UE) with a configured set of one or more transmission points (TRPs) for communicating in a wireless network;
receiving, from the UE, identification of at least one additional TRP transmitting signals received by the UE;
transmitting, to the UE, an instruction to switch a bandwidth part (BWP) used to communicate in the wireless network to a different BWP, wherein the different BWP is associated with a second set of one or more TRPs that at least one of includes at least one TRP that is not in the configured set of one or more TRPs causing the UE to activate communications with the at least one TRP or does not include at least one TRP that is in the configured set of one or more TRPs causing the UE to deactivate communications with the at least one TRP, and wherein the different BWP is associated with a single TRP or multiple TRPs.

* * * * *